US012743356B2

(12) United States Patent
Hons

(10) Patent No.: US 12,743,356 B2
(45) Date of Patent: Sep. 22, 2026

(54) METHOD AND SYSTEM FOR ESTABLISHING DATA TRANSFER PROCESSES BETWEEN COMPONENTS OF A TEST SYSTEM

(71) Applicant: National Instruments Corporation, Austin, TX (US)

(72) Inventor: Erik Stuart Hons, Austin, TX (US)

(73) Assignee: National Instruments Corporation, Austin, TX (US)

( * ) Notice: Subject to any disclaimer, the term of this patent is extended or adjusted under 35 U.S.C. 154(b) by 262 days.

(21) Appl. No.: 18/450,293

(22) Filed: Aug. 15, 2023

(65) Prior Publication Data

US 2024/0061757 A1 Feb. 22, 2024

Related U.S. Application Data

(60) Provisional application No. 63/398,285, filed on Aug. 16, 2022.

(51) Int. Cl.
*G06F 11/267* (2006.01)
*G06F 11/273* (2006.01)

(52) U.S. Cl.
CPC .......... *G06F 11/267* (2013.01); *G06F 11/273* (2013.01)

(58) Field of Classification Search
CPC ................ G06F 11/267; G06F 11/273; G06F 11/2273; G01R 31/31908
See application file for complete search history.

(56) References Cited

U.S. PATENT DOCUMENTS

| | | | | |
|---|---|---|---|---|
| 6,304,917 | B1 * | 10/2001 | Douceur | G06F 9/54 719/310 |
| 2005/0091392 | A1 * | 4/2005 | Gesswein | H04L 65/1036 341/89 |
| 2006/0282545 | A1 * | 12/2006 | Arwe | G06F 8/71 709/237 |
| 2020/0200819 | A1 * | 6/2020 | Malisic | G01R 31/31908 |

* cited by examiner

*Primary Examiner* — Mark D Featherstone
(74) *Attorney, Agent, or Firm* — Harness, Dickey & Pierce, P.L.C.

(57) ABSTRACT

In an example, a first testing device is configured to receive testing data from a second testing. The first testing device is configured to send a stimulus to a device under test. The first testing device obtains test data reception methods and test data reception formats that are compatible with the first testing device and translates the methods and formats into content that is readable by the second testing device. The content is received by the second testing device, which accesses test data transmission methods and formats compatible with the second testing device and defines an intersection of the reception and transmission test data formats. The second testing device sends the intersection of methods and formats to the first testing device, which reduces the intersection to a final method and format.

20 Claims, 11 Drawing Sheets

300

Figure 4:
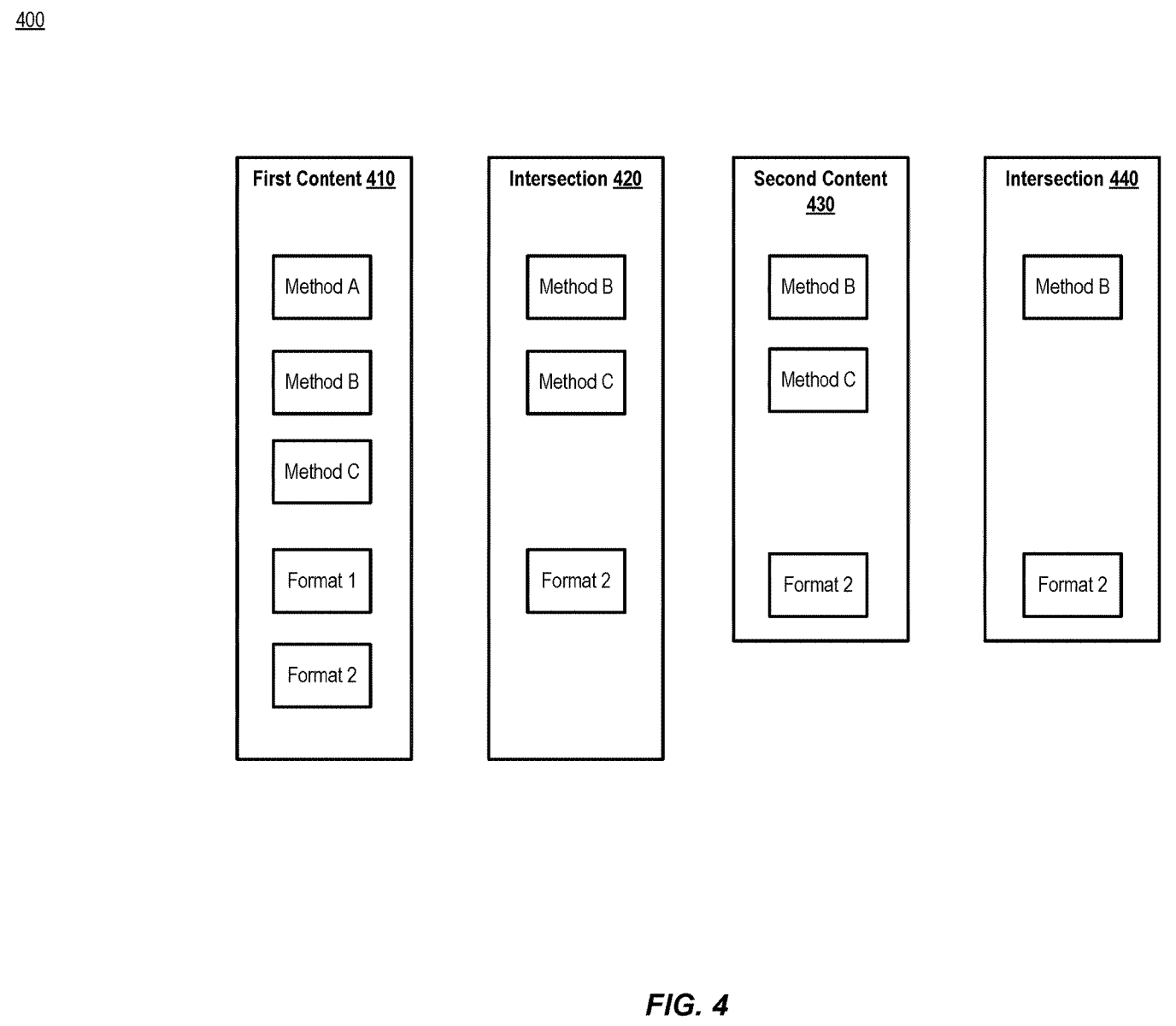

400

First Content 410
Method A
Method B
Method C
Format 1
Format 2

Intersection 420
Method B
Method C
Format 2

Second Content 430
Method B
Method C
Format 2

Intersection 440
Method B
Format 2

METHOD AND SYSTEM FOR ESTABLISHING DATA TRANSFER PROCESSES BETWEEN COMPONENTS OF A TEST SYSTEM

CROSS-REFERENCES TO RELATED APPLICATIONS

This application claims the benefit of U.S. Provisional Patent Application No. 63/398,285 filed Aug. 16, 2022, the contents of which is hereby incorporated by reference in its entirety.

BACKGROUND OF THE INVENTION

Modern electronics manufacturing and assembly systems may include an ever increasing number of distributed services to perform test and measurement operations. Despite the progress made in the area of test and measurement systems, there is a need for more efficient methods and systems for collecting data and generating results.

SUMMARY OF THE INVENTION

This disclosure generally relates to testing systems. More specifically, but not by way of limitation, this disclosure relates to configuring testing systems for testing physical devices.

Embodiments of the present invention generally relate to test and measurement of physical devices, and more specifically, but without limitation, to configuring testing systems for testing physical devices.

Numerous benefits are achieved by way of the present invention over conventional techniques. For example, embodiments of the present invention can provide a self-calibrating test and measurement system that can be reused in subsequent test procedures or be reconfigured in real time. Some embodiments can independently establish communication channels to provide highly efficient test systems. These and other embodiments of the invention, along with many of its advantages and features, are described in more detail in conjunction with the text below and corresponding figures.

In an embodiment, a method of testing a device involves accessing a first memory of a first testing device to obtain a test data reception methods and a test data reception formats usable by the first testing device. The method further involves translating, at the first testing device, the test data reception methods and the test data reception formats into a first content that is readable by testing devices. The method further involves transmitting, using a configuration bus, the first content from the first testing device to a second testing device. The method further involves accessing a second memory of the second testing device to obtain a test data transmission methods and a test data transmission formats. The test data transmission methods and the test data transmission formats are usable by the second testing device. The method further involves defining, at the second testing device, one or more test data transfer methods based on a first intersection of the test data reception methods and the test data transmission methods. The method further involves defining, at the second testing device, one or more test data transfer formats based on a second intersection of the test data reception formats and from the first content and the test data transmission formats. The method further involves translating, by the second testing device, the one or more test data transfer methods and the one or more test data transfer formats into a second content that is readable by the testing devices. The method further involves transmitting, over the configuration bus, from the second testing device to the first testing device, the second content. The method further involves determining, at the first testing device, a final test data transfer method and a final test data transfer format based on the second content. The method further involves translating, at the first testing device, the final test data transfer method and the final test data transfer format into a third content that is readable by the testing devices. The method further involves transmitting, from the first testing device to the second testing device, the third content. The method further involves receiving, at the first testing device, test data using the final test data transfer method and the final test data transfer format.

In a further embodiment, the first testing device is signal generation instrument (SGI) that is configured to generate a stimulus for the device under test and the second testing device is a data generation entity (DGE). The method further involves generating, at the first testing device, a testing stimulus based on the test data. In a further embodiment, delivering, to the device under test, the testing stimulus. Upon receipt of the testing stimulus, the device under test is stimulated by the test data.

In a further embodiment, the first testing device is a data processing entity (DPE) and the second testing device is a signal acquisition instrument (SAI). The method further involves receiving, at the second testing device, a result from the device in response to a stimulus. The method further involves transmitting, from the second testing device to the first testing device, the test data, the test data based on the result.

In a further embodiment, the method further involves determining that (i) the first intersection includes zero methods or (ii) the second intersection includes zero formats. The method further involves, responsive to the determining, sending an error message.

In a further embodiment, transmitting the first content from the first testing device to a second testing device includes transmitting the first content to an intermediary entity. Transmitting the first content from the first testing device to a second testing device includes accessing a third memory of the intermediary entity to obtain, a second test data reception methods and a second test data reception formats. Transmitting the first content from the first testing device to a second testing device includes combining, by the intermediary entity, the one or more test data transfer methods and the one or more test data transfer formats from the first content and the second test data reception methods and the second test data reception formats into a third test data reception methods and a third test data reception formats. Transmitting the first content from the first testing device to a second testing device includes translating, by the intermediary entity, the third test data reception methods and the third test data reception formats into a modified first content. The modified first content is readable by the testing devices. Transmitting the first content from the first testing device to a second testing device includes transmitting, from the intermediary entity, the modified first content to the second testing device.

In a further embodiment, transmitting, from the second testing device to the first testing device, the second content includes: transmitting the second content to an intermediary entity. Transmitting, from the second testing device to the first testing device, the second content further includes accessing a third memory of the intermediary entity to obtain a second test data transmission methods and test data transmission formats. Transmitting, from the second testing device to the first testing device, the second content further includes combining, by the intermediary entity, the one or more test data transfer methods and the one or more test data transfer formats from the second content and the second test data transmission methods and test data transmission formats to form a third test data transfer methods and a third test data transfer formats. Transmitting, from the second testing device to the first testing device, the second content further includes translating, by the intermediary entity, the third test data transfer methods and the third test data transfer formats into a modified second content. Transmitting, from the second testing device to the first testing device, the second content further includes transmitting the modified second content to the first testing device.

In a further embodiment, transmitting the third content includes transmitting the third content to an intermediary entity by the first testing device. Transmitting the third content includes determining a modified final test data transfer method and format by the intermediary entity. transmitting the third content includes translating the modified final test data transfer method and format into a modified third content that is readable by the testing devices.

In a further embodiment, a system for testing a device includes a data generation entity (DGE); and a signal generation instrument (SGI) configured to stimulate a device under test and configured to perform operations. The operations include accessing a first memory of an SGI to obtain a test data reception methods and a test data reception formats usable by the SGI. The operations include translating, at the SGI, the test data reception methods and the test data reception formats into a first content that is readable by a testing devices. The operations include determining, at the SGI, a final test data transfer method and a final test data transfer format based on a second content. The operations include translating, at the SGI, the final test data transfer method and the final test data transfer format into a third content that is readable by the testing devices. The operations include transmitting, from the SGI to the DGE, the third content. The operations include receiving, at the SGI, test data using the final test data transfer method and the final test data transfer format. The operations include generating, at the SGI, a testing stimulus based on the test data. The operations include delivering, to a device under test, the testing stimulus. Upon receipt of the testing stimulus, the device under test is stimulated by the test data. The DGE is configured to perform additional operations including accessing a second memory of the DGE to obtain a test data transmission methods and a test data transmission formats. The test data transmission methods and the test data transmission formats are usable by the DGE. The additional operations include defining, at the DGE, one or more test data transfer methods based on a first intersection of the test data reception methods and the test data transmission methods. The additional operations include defining, at the DGE, one or more test data transfer formats based on a second intersection of the test data reception formats and from the first content and the test data transmission formats. The additional operations include translating, by the DGE, the one or more test data transfer methods and the one or more test data transfer formats into the second content that is readable by the testing devices. The additional operations include transmitting, over a configuration bus, from the DGE to the SGI, the second content.

In a further embodiment, each of the test data transfer methods involves one or more of (i) a Direct Memory Access (DMA), (b) a socket, and (c) an inter-process communication.

In a further embodiment, each of the test data reception methods involves one or more of (i) a Direct Memory Access (DMA), (b) a socket, and (c) an inter-process communication.

In a further embodiment, the SGI is configured to perform operations including: determining that (i) the first intersection includes zero methods or (ii) the second intersection includes zero formats; and responsive to the determining, sending an error message.

In a further embodiment, transmitting, over the configuration bus, from the DGE to the SGI, the second content, includes operations. The operations include transmitting, from the DGE the second content to an intermediary entity. The operations include accessing a third memory of the intermediary entity to obtain, a second test data reception methods and a second test data reception formats. The operations include combining, by the intermediary entity, the one or more test data transfer methods and the one or more test data transfer formats from the first content and the second test data reception methods and the second test data reception formats into a third test data reception methods and a third test data reception formats. The operations include translating, by the intermediary entity, the third test data reception methods and the third test data reception formats into a modified second content. The modified second content is readable by the testing devices. The operations include transmitting, from the intermediary entity, the modified second content to the SGI.

In a further embodiment, transmitting the third content includes transmitting the third content to an intermediary entity by the first testing device. Transmitting the third content includes determining a modified final test data transfer method and format by the intermediary entity. Transmitting the third content includes translating the modified final test data transfer method and format into a modified third content that is readable by the testing devices.

In a further embodiment, the second intersection includes one or more common formats between the test data reception formats and from the first content and the test data transmission formats.

In a further embodiment, a system for processing testing data from a device includes a signal acquisition instrument (SAI); and a data processing entity (DPE) configured to perform operations. The operations include obtaining a test data reception methods and a test data reception formats usable by the DPE. The operations include translating the test data reception methods and the test data reception formats into a first content that is readable by a testing devices. The operations include determining a final test data transfer method and a final test data transfer format based on a second content. The operations include translating the final test data transfer method and the final test data transfer format into a third content that is readable by the testing devices. The operations include transmitting, to the SAI, the third content. The operations include receiving, from the SAI and from the device under test, a result using the final test data transfer method and the final test data transfer format. The SAI is configured to perform additional operations. The additional operations include accessing a memory of the SAI to obtain a test data transmission methods and a test data transmission formats. The test data transmission methods and the test data transmission formats are usable by the SAI. The additional operations include defining, at the SAI, one or more test data transfer methods based on a first intersection of the test data reception methods and the test data transmission methods. The additional operations include defining, at the SAI, one or more test data transfer formats based on a second intersection of the test data reception formats and from the first content and the test data transmission formats. The additional operations include translating, by the SAI, the one or more test data transfer methods and the one or more test data transfer formats into the second content that is readable by the testing devices. The additional operations include transmitting, over a configuration bus and to the DPE, the second content. The additional operations include receiving a result from a device under test. The device under test is stimulated by an external device. The additional operations include transmitting the result to the DPE.

In a further embodiment, the final test data transfer method involves one or more of (i) a Direct Memory Access (DMA), (b) a socket, and (c) an inter-process communication.

In a further embodiment, each of the test data reception methods involves one or more of (i) a Direct Memory Access (DMA), (b) a socket, and (c) an inter-process communication.

In a further embodiment, the SAI is configured to perform operations including: determining that (i) the first intersection includes zero methods or (ii) the second intersection includes zero formats; and responsive to the determining, sending an error message.

In a further embodiment, transmitting, over the configuration bus, and do the DPE, the second content, includes operations. The operations include transmitting, from the SAI the second content to an intermediary entity. The operations include accessing a third memory of the intermediary entity to obtain, a second test data reception methods and a second test data reception formats. The operations include combining, by the intermediary entity, the one or more test data transfer methods and the one or more test data transfer formats from the first content and the second test data reception methods and the second test data reception formats into a third test data reception methods and a third test data reception formats. The operations include translating, by the intermediary entity, the third test data reception methods and the third test data reception formats into a modified second content. The modified second content is readable by the testing devices. The operations include transmitting, from the intermediary entity, the modified second content to the DPE.

In a further embodiment, transmitting, to the SAI, the third content includes transmitting the third content to an intermediary entity by the first testing device. Transmitting, to the SAI, the third content includes determining a modified final test data transfer method and format by the intermediary entity. Transmitting, to the SAI, the third content includes translating the modified final test data transfer method and format into a modified third content that is readable by the testing devices.

BRIEF DESCRIPTION OF THE DRAWINGS

Embodiments and features of the various embodiments will be more apparent by describing examples with reference to the accompanying drawings, in which:

FIG. 4 is a block diagram of an intersection of testing methods and formats, according to various embodiments of the present disclosure;

DETAILED DESCRIPTION OF THE INVENTION

Figure 1:
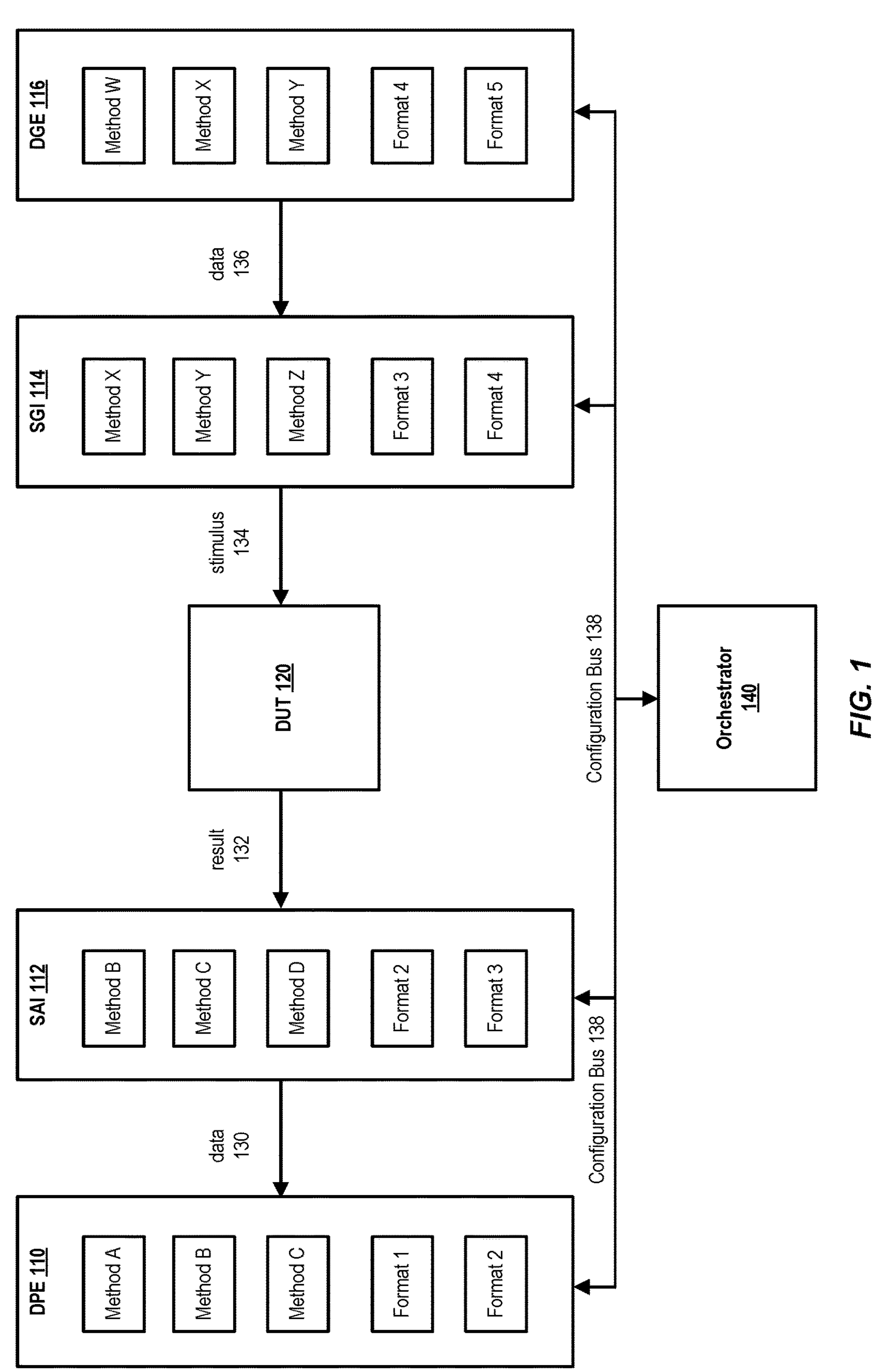
FIG. 1 is a block diagram of a system for testing physical devices, according to various embodiments of the present disclosure.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Embodiments of the present invention relate to configuring testing systems for testing of physical devices such as electronic components. Testing of physical devices can involve one or more test sequences performed by one or more testing entities, including causing an application of a stimulus to a device under test (DUT) and measuring the result. For instance, a first testing entity (or device) applies a voltage, current, pressure, or other stimulus to the DUT, and a second testing entity (or device) measures a result from the DUT that is caused as a result of the stimulus being applied. This testing and gathering of results can be automated. Non-limiting examples of testing entities include data generation entities, signal generation instruments, signal acquisition instruments and data processing entities.

Configuration of the testing entities can occur prior to and during testing of a DUT. For instance, to apply a stimulus, test data is generated in a processing domain and is transmitted to input/output (I/O) instruments where the test data causes the I/O instruments to generate stimulus signals. The stimulus signals are provided to the DUT. Similarly, to measure results, test data is collected from I/O instruments that are configured to acquire result signals. The test data is sent to a processing domain where measurement calculations are performed.

A given test is performed by a series of test system entities that perform the operations. The entities can be arranged into a pipeline through which data flows from one entity to the next. For instance, a data generation entity (DGE) sends data to a signal generation instrument (SGI), which in turn causes the DUT to be stimulated. From the DUT, a signal acquisition instrument (SAI) measures the result of the stimulus, which is processed by the data processing entity (DPE). One or more software processes executing on a computing device can manage this flow.

In some embodiments, each test is performed by a set of test system entities that perform various operations. The entities are arranged into pipelines in which data flows from one entity to the next. An example is a data acquisition (DAQ) device, which sends acquired data to a software process that filters the data and then sends the data to a software process that checks for an out of bounds error.

A test system can minimize test time by making optimal use of the testing entities by allowing them to run in parallel and minimizing the time that the entities spend waiting for data to move. Making optimal use of entities that can operate in parallel can be difficult. In test systems that test multiple DUTs or perform multiple tests in parallel there are many such entities. Distributed test systems add additional complexity; the pipeline entities are on separate systems connected by a network and cannot be part of a single process. But for these reasons, high performance test systems are difficult to develop. Because of this difficulty, high-performance test systems are typically created by skilled test architects and are manually optimized. Test architects are an expensive resource and optimizing test systems manually takes time. For this reason, high-performance test systems can be expensive to create and often fail to reach their optimal performance.

By contrast, disclosed techniques reduce the cost and time to create high performance test systems by automating configuration of the individual test data transfers between testing elements, while achieving the same performance as a manually optimized system. This results in distributed test systems easier and less expensive to create. Disclosed techniques provide a method for independent test system entities to form a test data transfer pipeline that leverages the highest performing test data transfer capabilities among the entities in the pipeline, during system operation.

The following non-limited example is introduced to illustrate certain embodiments. A first testing device (such as an SGI) is configured to receive testing data from a second testing device (such as a DGE). In turn, the first testing device is configured to send a stimulus to a DUT. Prior to any testing, the first testing device obtains test data reception methods and test data reception formats that are compatible with the first testing device and translates the methods and formats into content that is readable by the second testing device. The content is received by the second testing device, which accesses test data transmission methods and formats compatible with the second testing device and defines an intersection of the reception and transmission test data formats. The second testing device sends the intersection of methods and formats to the first testing device, which reduces the intersection to a final method and format. Optionally, the first testing device then applies a stimulus to the DUT, and testing commences.

FIG. 1 is a block diagram of a system for testing physical devices, according to various embodiments of the present disclosure. As depicted, system 100 involves a collection of testing entities including software processes to generate stimulus data, an instrument to generate stimulus signals, an instrument to acquire result signals, and software processes to analyze result data. In the example depicted in FIG. 1, data processing entity (DPE) 110, signal acquisition instrument (SAI) 112, signal generation instrument (SGI) 114, data generation entity (DGE) 116, and orchestrator 140 facilitate testing of a device under test (DUT) 120. While various entities of system 100 are listed with specific names and roles, it will be appreciated that other entities and other arrangements thereof are possible. Moreover, although single instruments are illustrated in FIG. 1, it will be appreciated that multiple instruments can be utilized to implement the various embodiments of the present invention described herein.

Data processing entity (DPE) 110 is a test system entity that is a test data reception element that stores, analyzes, and/or retransmits test data from another test system entity. Test data may be stored to a file system or other data storage system. Test data may be transformed into a test result, measurement(s), or alternative data formats. The transformation may be performed by a software algorithm or with the assistance of hardware (also known as hardware acceleration). Examples of data processing entities include a software library, program, or a Field Programmable Gate Array (FPGA). DPE 110 can include one or more test data reception elements (not depicted) that receive data 130 from SAI 112.

Signal acquisition instrument (SAI) 112 is a test system entity that includes one or more test data transmission elements that convert signals produced by a device under test into test data. A signal acquisition instrument may include a software driver. SAI 112 can send raw or processed data. Examples of SAIs include data acquisition system (DAQ) devices, digital multi-meters, and signal analyzers. SAI 112 can have one or more test data transmission elements (not depicted) that transmit data 130. SAI also receives result 132 from DUT 120.

As illustrated in FIG. 1, DPE 110 can utilize Method A, Method B, and Method C and Format 1 and Format 2 to communicate. Similarly, SAI 112 can utilize Method B, Method C, and Method D and Format 2 and Format 3 to communicate. Thus, in this example, DPE 110 and SAI 112 have support for three test data reception and transmission methods, each of which may be shared and two test data reception and transmission formats, which may be shared. Other numbers of methods and formats are possible.

Signal generation instrument (SGI) 114 is a test system entity that is a test data reception element that converts test data into signals applied to a device under test. SGI 114 may include a software driver. SGI 114 can receive raw or processed data. Examples of SGI 114 include function generation devices, analog output devices, or digital out devices. SGI 114 can include one or more test data reception elements (not depicted) that receive data 136 from DGE 116. SGI 114 stimulates DUT 120 with stimulus 134.

Data generating entity (DGE) 116 is a test system entity that is a test data transmission element which loads, generates, and/or retransmits test data from another test system entity. Test data may be loaded from a file system or other data storage system. Test data may be generated from a signal generation algorithm. The generation may be performed with the assistance of hardware (also known as hardware acceleration). Examples of data generating entities include a software library, program, or an FPGA. DGE 116 can have one or more test data transmission elements (not depicted) that transmit data 136.

The DGE and SGI each has support for three test data transmission/reception methods that may be shared. Similarly, each has support for two test data transmission/reception formats that may be shared.

In system 100, stimulus data is transferred from the software process that generated it to the signal generation instruments, which convert it into stimulus signals that are applied to the DUT. The DUT produces result signals that are converted into result data by signal acquisition instruments and the result data is transferred to the data processing software or hardware that produces a test result. Test data can be either stimulus data or result data.

DPE 110, SAI 112, SGI 114, and DGE 116 are connected via configuration bus 138. These devices are used together to perform tests on DUT 120 and produce a test result. The devices may be under the control of orchestrator 140. Orchestrator 140 is a test system entity that applies configuration to the other entities in the system, Examples of orchestrators include human operators, complete applications, and software processes with a configuration bus to communicate with the other test system entities.

The DPE 110 and SAI 112 can operate in isolation from the SGI 114 and DGE 116. For instance, the transfer of data 130 between DPE and SAI 112 is independent from the transfer of data 136 between DGE 116 and SGI 114.

There are two test data transfers represented in this system: from the DGE to the SGI (prior to measurement of the DUT), and from the SAI to the DPE (after measurement of the DUT). These transfers are independent, and the pre-measurement entities can exist and operate independently of the post-measurement entities. One of ordinary skill in the art would recognize many variations, modifications, and alternatives.

Signal acquisition instruments convert electrical signals to test data. Each electrical signal is connected to a channel on the instrument. Channels convert signals to test data. Some instruments have multiple channels and can place the data for multiple channels in a single test data transfer. The format information for the test data will include a description of the channels included. If an instrument is producing test data with a single channel, a single channel format can be used. If the instrument is producing test data with multiple channels, a multi-channel format can be used. The test data format also describes how to recover individual channels from multi-channel test data. Signal generation instruments work in a similar manner in reverse; they accept test data, extract the data for individual channels, and generate electrical signals. Thus, it is test data that is transmitted from one entity to another.

Figure 2:
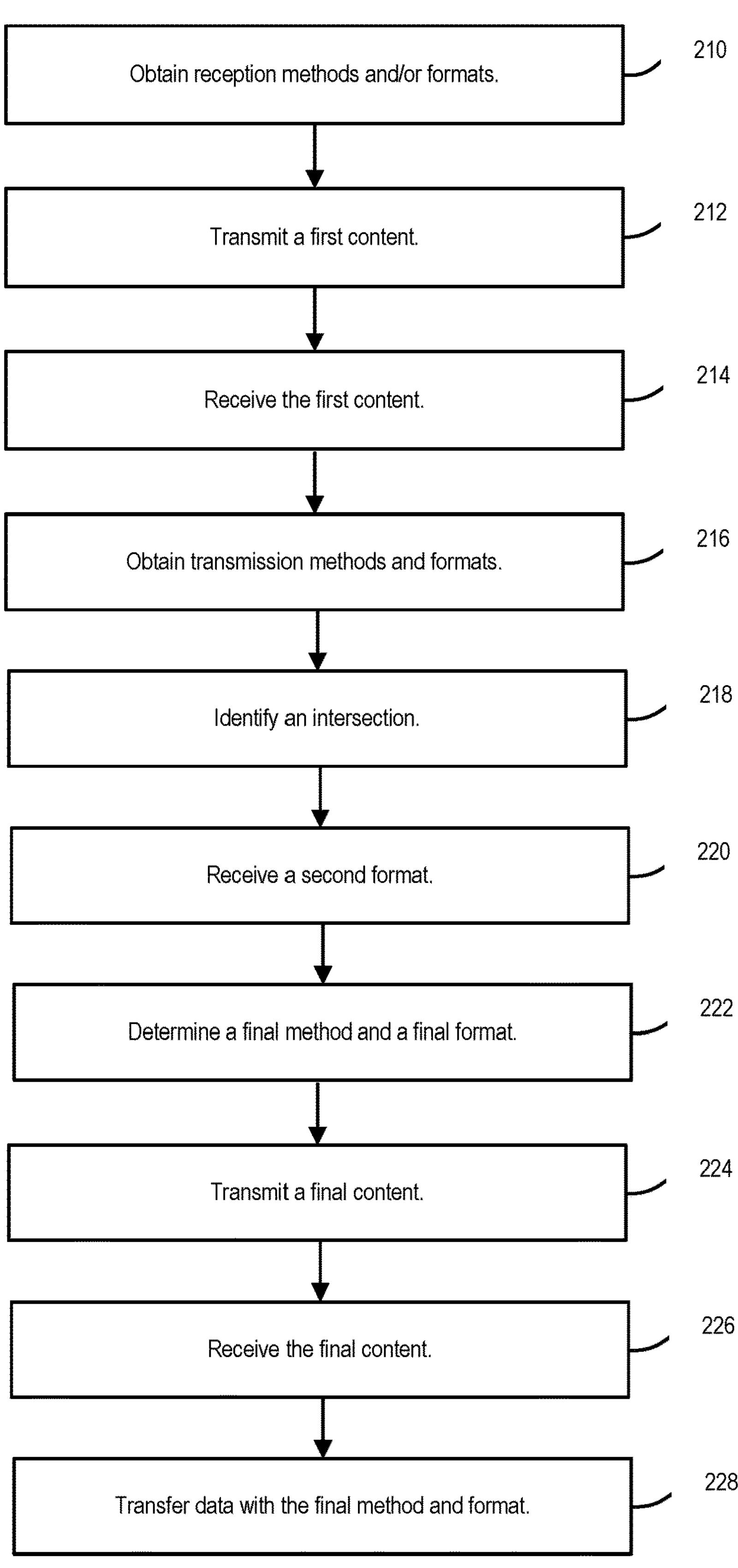
FIG. 2 is a flowchart of a method for testing physical devices, according to various embodiments of the present disclosure.

FIG. 2 is a flowchart of a method 200 for testing physical devices, according to various embodiments of the present disclosure. For example purposes, method 200 is discussed with respect to a first testing device (e.g., SGI 114) and a second testing device (e.g., DGE 116). But other examples are possible. For instance, method 200 can be performed by the DPE 110 and the SAI 112.

The method 200 may be embodied on a non-transitory computer readable medium, for example, but not limited to, a memory, storage device, or other non-transitory computer readable medium known to those of skill in the art, having stored therein a program including computer executable instructions for making a processor, computer, or other programmable device execute the operations of the methods, and may be distributed among the various rule engines and station controllers and associated storage devices as described in accordance with various embodiments of the present disclosure.

At block 210, method 200 involves obtaining reception methods and/or formats. For example, a first testing device (e.g., SGI 114) obtains test data reception methods and test data reception formats that are usable by the first testing device. For instance, the first testing device accesses a memory (e.g., of the first testing device) and obtains test data reception methods and test data reception formats usable by the first testing device.

A test data reception method is a method for a test data reception element to receive test data from a test data transmission element in a test data transfer. A test data reception method can include a test data transfer mechanism and properties of the mechanism. Examples of a test data transfer mechanism include: Direct Memory Access (DMA), a socket (e.g., a Linux socket), and an inter-process communication. Examples of properties include a receive buffer address and size and socket properties.

A test data reception format is an encoding method for representing test data as bits in a test data transfer. The test data reception format can have one or more properties such as data type, bit width, precision, scaling formula, scaling formula constants, number of channels, layout of channel data, and the like.

Continuing the example, the first testing device translates the test data reception methods and formats into a first content that is readable by other testing devices. For instance, test data transmission elements of DGE 116 can read the first content. In some embodiments, the test data reception element (e.g., SGI 114) controls the process for establishing communications. Accordingly, an analysis of the methods and formats usable by the test data reception element is performed and these methods and formats are translated into a universal format, i.e., the first content.

At block 212, method 200 involves transmitting a first content. Continuing the example, the first testing device (e.g., the SGI 114) transmits, using the configuration bus 138, the first content, e.g., the test data reception methods and formats in a universal format, from the first testing device to a second testing device (e.g., the DGE 116). The first content can be a standard machine readable representation of structured data (such as JSON, XML, YAML) that contains the test data reception methods and formats supported by a test data reception element. The elements in the test system must agree on the representation and structure used.

Figure 6:
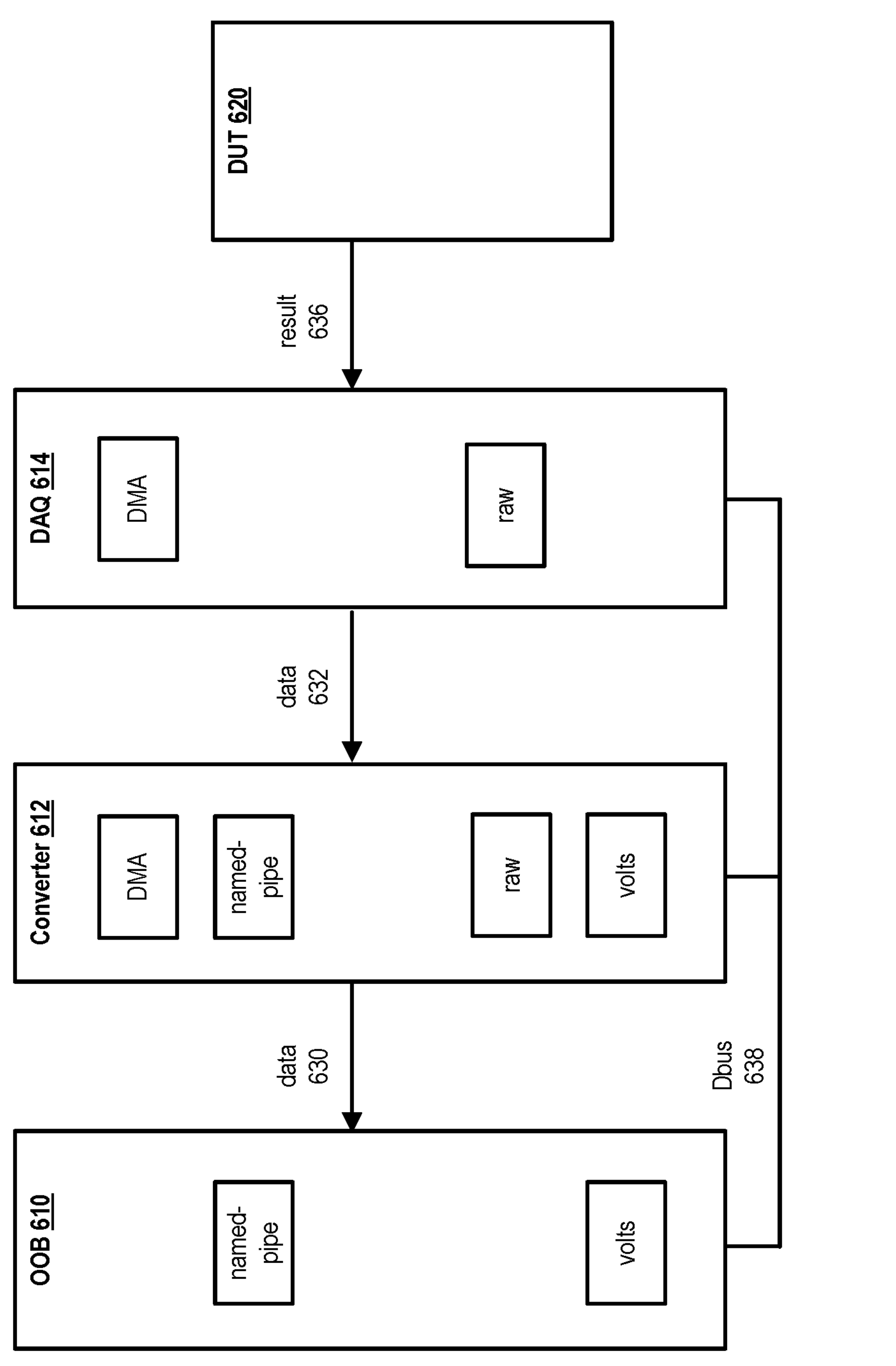
FIG. 6 is a block diagram of a system for testing physical devices by way of an intermediary, according to various embodiments of the present disclosure.

In some cases, for example, as discussed in relation to FIG. 6, transmission of the first content can involve an intermediary entity.

At block 214, method 200 involves receiving the first content. Continuing the example, the second testing device (e.g., the DGE 116) receives the first content.

At block 216, method 200 involves obtaining transmission methods and formats. Continuing the example, the second testing device accesses its memory and obtains test data transmission methods and test data transmission formats that are usable by the second testing device.

A test data transmission method is a method for a test data transmission element to send test data to a test data reception element in a test data transfer. A test data transmission method includes a test data transfer mechanism and properties of the mechanism. Examples of the mechanism include Direct Memory Access (DMA), a socket (e.g., a Linux socket), and an inter-process communication inter-process communication. Examples of properties include a receive buffer address and size and socket properties.

A test data transmission format is an encoding method for representing test data as bits in a test data transfer. The format can have one or more properties such as data type, bit width, precision, scaling formula, scaling formula constants, number of channels, or layout of channel data.

At block 218, method 200 involves identifying an intersection. The intersection represents methods and formats that are common between the first testing device and the second testing device. Continuing the example, the second testing device defines one or more test data transfer methods based on an intersection of the test data reception methods and the test data transmission methods.

In some cases, the intersection contains no methods. For instance, the second testing device identifies that the first intersection comprises zero methods and responsive to the determining, sending an error message. Testing cannot continue without reconfiguration.

The second testing device, e.g., a test data transmission element, identifies a test data transfer method as an intersection of test data reception and test data transmission methods by identifying methods shared by the test data transmission element and the test data reception element with identical mechanisms and compatible properties. Matching mechanisms can be sufficient. In some cases, the second testing device matches the properties also. In general, for each test data reception method, the list of transmission methods will be scanned and, for those with a matching mechanism, the properties will be scanned to verify that the properties are compatible. This comparison can depend on the specific mechanism and entity doing the comparison. The test data transmission element can restrict the intersection further if it so chooses to ensure system level requirements are met.

In some cases, the intersection contains no formats. For instance, the second testing device identifies that the first intersection comprises zero formats and responsive to the determining, sending an error message. Testing cannot continue without reconfiguration in some embodiments.

Continuing the example, the second testing device defines one or more test data transfer formats based on an intersection of the test data reception formats and from the first content and the test data transmission formats.

The second testing device, e.g., a test data transmission element, identifies a test data transfer format as an intersection of test data reception and test data transmission formats by identifying formats shared by the test data transmission element and receiver element with compatible properties. In general, for each test data reception format, the list of transmission formats will be scanned, and the properties compared or consulted to verify they are compatible. This comparison will depend on the specific entity doing the comparison. The test data transmission element can restrict the intersection further to ensure system level requirements are met.

In an embodiment, the test data transmission element ranks the combined list of methods and formats from the intersection and optionally adds additional properties to inform the final selection made by the test data reception element as discussed more fully below in relation to block 222. The ranking can be used to select the method and format to be used when the intersection includes multiple methods and/or formats.

Following the definition of the intersection, the second testing device translates the test data transfer methods and the test data transfer formats into a second content, which can be in a universal format. The second content is readable by the data reception elements of the first testing device and/or the second testing device. Continuing the example, the second testing device transmits the second content over the configuration bus. In some cases, for example, as discussed in relation to FIG. 6, transmission of the second content can involve an intermediary entity.

At block 220, method 200 involves receiving a second format. Continuing the example, the first testing device receives the second content over the configuration bus. The second content is a standard machine readable representation of structured data (such as JSON, XML, YAML) that contains the test data reception methods and formats supported by both the test data transmission element and test data reception element. The elements in the test system agree on the representation and structure used.

At block 222, method 200 involves determining a final method and format. Continuing the example, the first testing device determines a final test data transfer method and a final test data transfer format based on the second content. This operation can be referred to as down-selection. The first testing device translates the final test data transfer method and the final test data transfer format into a third content (i.e., a universal format) that is readable by a plurality of test data transmission elements on the first or second testing devices.

Determining a final test data transfer method is performed by the test data reception element by selecting a single method from the intersection of transmission and reception methods recorded in the second content. A typical selection method will identify all valid combinations of transmission and reception methods to form a list of transfer methods; rank the test data transfer methods so identified based on overall system goals such as throughput, latency, or CPU usage; and then select the best ranked method. This ranking may be influenced by the final test data format selected. For example, a lower throughput method might be appropriate if the data format is dense.

Determining a final test data transfer format is performed by the test data reception element by selecting a single format from the intersection of transmission and reception formats. A typical selection method will rank the test data transfer formats identified in the intersection based on overall system goals such as memory or CPU usage and select the best ranked format. This ranking may be influenced by the final test data transfer method selected. For example, a less dense format might be appropriate if the data transfer method is high throughput.

At block 224, method 200 involves transmitting the final content. Continuing the example, the first testing device transmits the final content to the second testing device. The final content is a standard machine readable representation of structured data (such as JSON, XML, YAML) that contains the final test data transfer method and format selected by the test data reception element. The entities in the test system agree on the representation and structure used. In some cases, for example, as discussed in relation to FIG. 6, transmission of the final content can involve an intermediary entity.

At block 226, method 200 involves receiving a final content. Continuing the example, the first testing device receives, from the second testing device, test data, e.g., instructions or results, using the final test data transfer method and the final test data transfer format. A final test data transfer method is a combination of test data transmission and reception methods with identical methods and compatible properties. A final test data transfer format is a combination of test data transmission and reception formats with compatible properties.

At block 228, method 200 involves transferring data with the final method and format. Continuing the example, with the final method and format established, data can be transferred.

Subsequent to one or more operations of method 200, testing can take place. For instance, the first testing device (e.g., SGI 114) can generate a testing stimulus based on the data received from DGE 116. SGI 114 applies the stimulus to the DUT 120, which is stimulated by the test data.

Continuing the example, in response to a stimulus, the second testing device receives the result from the device under test and the second testing device transmits the test data to the first testing device based on the result.

Figure 3:
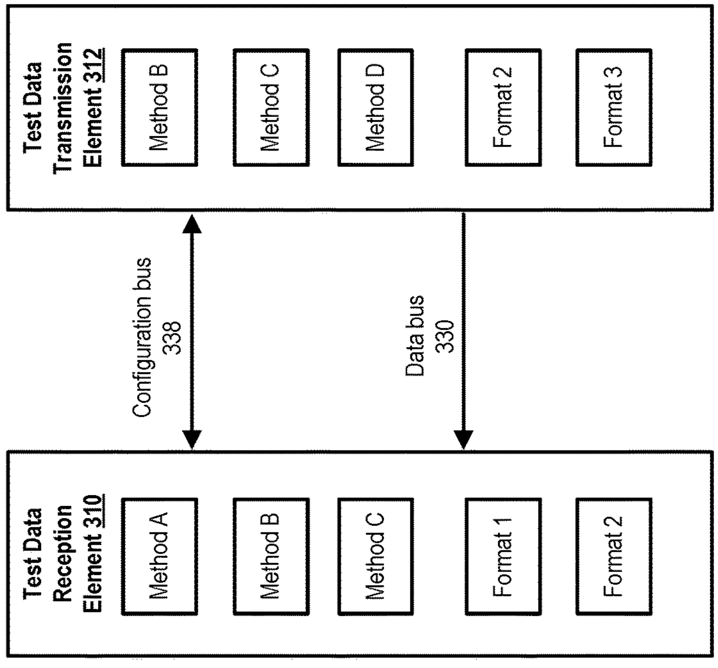
FIG. 3 is a block diagram of a test data reception element and a test data transmission element, according to various embodiments of the present disclosure.

FIG. 3 is a block diagram 300 of a test data reception element and a test data transmission element, according to various embodiments of the present disclosure. FIG. 3 depicts test data reception element 310 and test data transmission element 312. As can be seen, data reception element 310 and test data transmission element 312 are connected via configuration bus 338 and a data bus 330.

In the example depicted, each element has support for three test data transfer methods and two test data formats. Of the test data transfer methods, two methods 'B' and 'C' are shared, and 'A' and 'D' are not. Of the test data transfer formats, each element has support for two test data transfer formats of which format '2' is shared while '1' and '3' are not. Accordingly, FIG. 3 illustrates the test data reception methods and formats discussed with respect to block 212 of method 200 and the test data transmission methods and formats discussed with respect to block 216 of method 200.

FIG. 4 is a block diagram 400 of an intersection of testing methods and formats, according to various embodiments of the present disclosure. FIG. 4 depicts first content 410, intersection 420, second content 430, and intersection 440. As can be seen, first content 410 includes methods A, B and C, and formats 1 and 2, whereas second content 430 includes methods B and C and format 2. Accordingly, intersection 420 includes methods B and C and format 2, which are common across both first content 410 and second content 430. Intersection 420 represents the intersection determined at block 218 of method 200.

Continuing the example, intersection 440 represents a further narrowing of intersection 420. As can be seen, a method must be chosen from B and C as there is more than one overlapping method. Intersection 440 therefore represents a final selection of methods and formats, e.g., as determined at block 222 of method 200.

Figure 5:
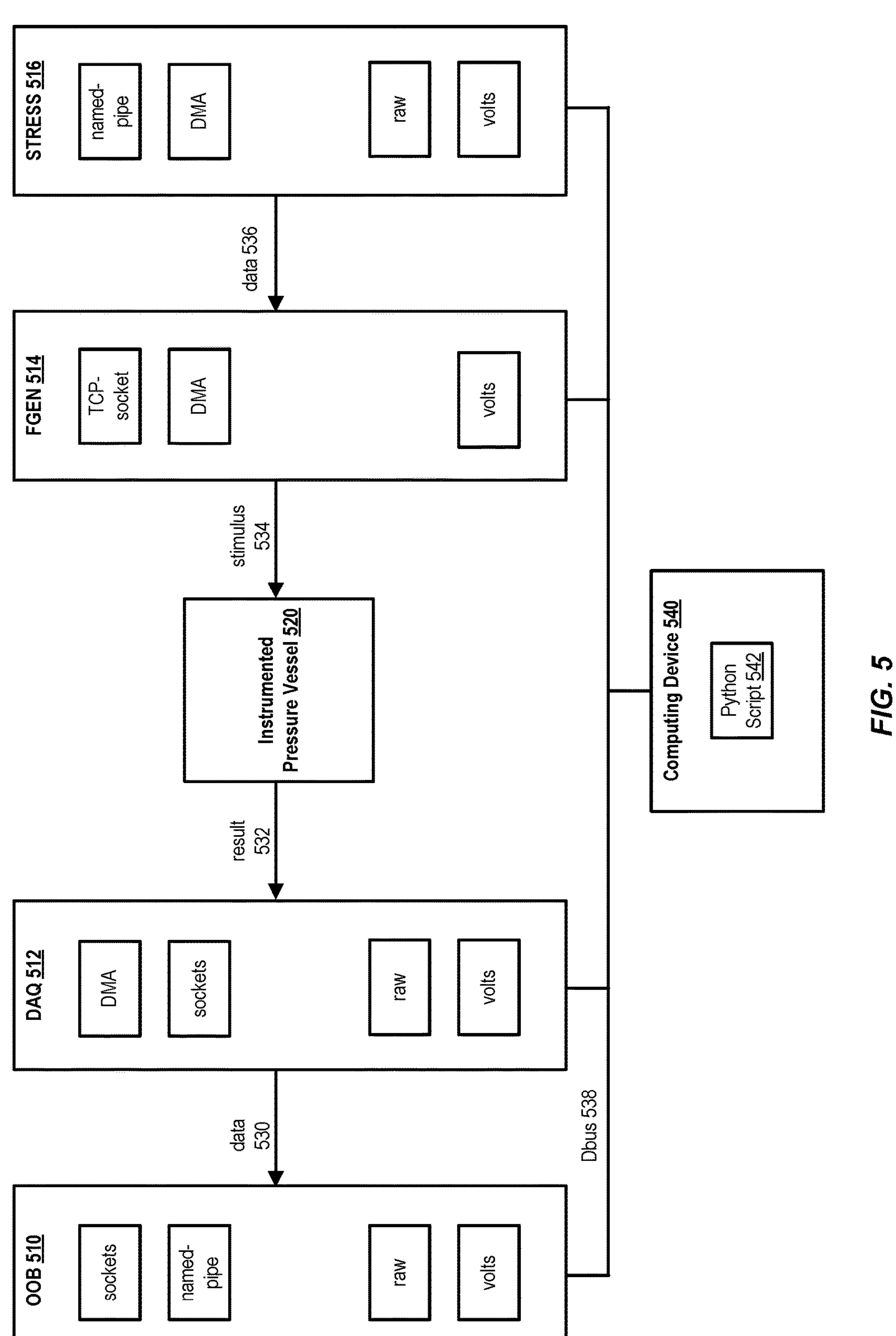
FIG. 5 is a block diagram of a system for testing physical devices, according to various embodiments of the present disclosure.

FIG. 5 is a block diagram of a system 500 for testing physical devices, according to various embodiments of the present disclosure. Relative to system 100, system 500 uses a partially software-based approach. System 500 includes various entities such as software process (OOB) 510, data acquisition instrument (DAQ) 512, function generator instrument (FGEN) 514, stress 516, instrumented pressure vessel 520, which can be the DUT, and computing device 540. The entities depicted in FIG. 5 can perform one or more methods such as method 200. Stress 516 provides data 536 to FGEN 514, which in turn provides stimulus 534 to instrumented pressure vessel 520, which in turn provides result 532 to DAQ 512, which provides data 530 to OOB 510. As an example, data 536 can include a pressure that is to be applied to instrumented pressure vessel 520 and a time period during which the pressure is to be applied. As discussed in relation to FIG. 2, the final format and method are utilized to communicate data 536. In response to data 536, FGEN 514 generates stimulus 534 that is applied to instrumented pressure vessel 520.

OOB 510 is a data processing entity that is a test data reception element that can apply an out of bounds check to acquired data. DAQ 512 can gather result 532 from instrumented pressure vessel 520. FGEN 514, which can include a driver, operates as a signal generation entity, i.e., a test data reception element. Instrumented pressure vessel 520 includes a pressure vessel, one or more actuators, one or more strain gauges, and the like. The instrumented pressure vessel can be referred to as a device under test (DUT). Stress 516 can be a software process acting as a DGE having a test data transmission element that generates a stress profile. DAQ 512, which can include a driver, operates as a signal acquisition instrument, i.e., a test data transmission element. Computing device 540 can execute a program or script (e.g., a Python script) that acts as an orchestrator. It should be noted that computing device 540 does not specify the methods or formats used for communication by stress 516 and FGEN 514 or DAQ 512 and OOB 510. Rather, the methods and formats are selected independently of computing device 540.

In the example depicted in FIG. 5, the entities of system 500 apply a physical force to the DUT and validate whether the strain stays within specified bounds. Computing device 540 can use the DBus 538 to apply the FGEN 514 to the stress profile to produce stimulus signals to the DUT, and then apply an out of bounds check to the test data acquired by the DAQ device from the strain gauges. It should be noted that one or more of the entities of system 500 can be remote from each other. As an example, FGEN 514 and DAQ 512 can be connected to instrumented pressure vessel 520, but stress 516 and OOB 510 can be located remotely. Accordingly, to run a different test, FGEN 514 can connect to a different test data transmission element and DAQ 512 can connect to a different test data reception element. Accordingly, embodiments of the present invention enable the test data transmission elements (e.g., stress 516) and test data reception elements (e.g., OOB 510) to be implemented as services that can be connected to test data reception elements (e.g., FGEN 514) and test data transmission elements (e.g., DAQ 512), respectively, thereby enabling the test data reception elements (e.g., FGEN 514) and test data transmission elements (e.g., DAQ 512) to communicate with and work in conjunction with a variety of different test data transmission elements (e.g., a replacement for stress 516) and test data reception elements (e.g., a replacement for OOB 510).

The entities of system 500 use the DBus 538 as a configuration bus to exchange configuration data. For instance, OOB 510, DAQ 512, FGEN 514, and/or stress 516 publish their respective DBus 538 endpoints on which each device can receive messages. Python script 542 forms connections between them by configuring the DBus 538 endpoints that the other entities send messages to, thereby forming a logical connection between entities. However, as described herein, the DAQ 512 and FGEN 514, in conjunction with OOB 510 and stress 516, respectively, define the methods and formats utilized for test data transmission and reception.

Stress 516 is able to support named pipe and direct memory access (DMA) as data transmission methods and raw (unscaled) and floating point data (volts) data transmission methods. Moreover, FGEN is able to support TCP-socket and DMA as data reception methods and floating point data (volts) as the data reception format.

OOB 510 is programmed to support sockets and named pipes and to represent that list of test data transfer mechanisms in JSON format. The supported socket types and access methods are encoded as properties of the socket method. OOB 510 is also programmed to support raw (unscaled) data and floating point values representing parameters (e.g., volts). OOB 510 can represent such a list of test data transfer formats in JavaScript Object Notation (JSON) format. It is further programmed to send those lists to another entity as the first content as shown below:

```
[{“mechanism”: “named pipe”,
    “properties”: {
      “name”: “myPipe” }},
  {“mechanism”: “socket”,
    “properties”: {
      “domain”: “unix”,
      “type”: “raw”,
      “protocol”: “device” }},
  {“format”: “raw”},
  {“format”: “float”}]
```

The driver in DAQ 512 is programmed to support direct memory access (DMA) and sockets and to represent that list of test data transfer mechanisms as JSON. The capabilities of the DMA controller (e.g. 64/32-bit addressing, access alignment width, minimum transfer size) are encoded as properties of the DMA mechanism. DAQ 512 is programmed to use raw (unscaled) and floating point data formats. The scaling function and parameters used to convert raw data to engineering units are encoded as properties of the raw format. In this example the DAQ 512 is able to scale the data and provide it as volts in floating point. This is encoded as properties of the floating point format.

DAQ 512 can be further programmed to receive a list of test data transfer methods and formats, determine the set of transmission and reception method pairings that are compatible, and transmit that resulting list in JSON format to another entity as the second content as shown below:

```
[{“mechanism”: “DMA”,
    “properties”: {
      “addressing”: “64 bits”,
      “alignment”: “16 bytes”,
      “minTransfer”: “256 bytes”}},
  {“mechanism”: “socket”,
    “properties”: {
      “domain”: “unix”,
      “type”: “raw”,
      “protocol”: “device” }},
  {“format”: “raw”,
    “properties”: {
      “scaling”: “linear”,
      “m, b”: “1.01, 3.331”}},
  {“format”: “float”
    “properties”: {
      “hardware”: true}}]
```

OOB 510 is further programmed to receive the list of compatible test data transfer methods and formats and pick the one that minimizes CPU usage (in this case, the hardware scaled values). It transmits this result in JSON format as the third content as shown below:

```
[{“mechanism”: “socket”,
    “properties”: {
      “domain”: “unix”,
      “type”: “raw”,
      “protocol”: “device” }},
```

-continued

```
  {“format”: “float”
    “properties”: {
      “hardware”: true}}]
```

After receiving the third content, DAQ 512 then configures the operations used to acquire the data, scales the data, and transmits the data over the socket as floating point values.

In an embodiment, system entities can be different hosts connected by a network and can use this method to automatically and adaptably establish test data transfer. An example is the system from FIG. 5 depicting OOB 510 and DAQ 512 on separate hosts connected by Ethernet. DBus 538 is the configuration bus and a TCP stream is the data transfer method.

New test operations often require making a different measurement with the same instrument. Copying the procedure or code to establish data transfer for the new test can be time consuming and error prone. This method can automate that process and do so adaptably. An example is the system from example 1 where the software process implements an average measurement (AVG) instead of out of bounds. In this case, DAQ 512 will be configured to use the new AVG entity’s DBus endpoint when setting up data transfer. Method 200 can be used to select the optimal shared data transfer method and format based on the new entity’s capabilities. In effect, this implements a new test without any programming changes.

Existing test operations often have to be re-implemented on new hardware. Copying the procedure or code to establish data transfer for the new test can be time consuming and error prone. This method can automate that process adaptably and on demand. One example is depicted in FIG. 5, in which an oscilloscope is used instead of a DAQ 512. OOB 510 can be configured by the orchestrator to use the new device’s DBus endpoint when setting up data transfer. Using method 200, the optimal shared data transfer method and format can be determined based on the new device’s capabilities. Thus, new tests can be implemented without the need for programming changes.

Test operations often include multiple signals and channels. One example is use of a test system that employs actuators to apply force to the vessel while acquiring many strain measurements. In this example, a system may require multiple entities such as OOB, DAQ, FGEN, and/or STRESS entities to create, acquire, generate, and analyze those signals to automate establishing test data transfer between entities.

Some DUTs are tested through electrical communication interfaces instead of via transducers. DUT can be a USB to Serial device. In this case, the stimulus signals are serial signals applied directly to the DUT’s serial port and the result signals are USB packets read from the DUT’s USB port. Instead of DAQ 512 and OOB 510 to acquire and measure the results, a USB packet recording entity and a protocol analyzing entity are used. Similarly, a Serial data generator entity and Serial port entity are used instead of Stress/FGen entities.

Some DUTs require a mix of physical events and electrical signals to test. An example is the system from example 1 where the DUT is an “electro-mechanical” device with a mix of direct signal application and measurement and signal application and measurement through transducers. Some test operations do not require stimulus and perform only measurements. An example is the system as depicted in FIG. 1, without DGE 116 or SGI 114. In this example the test system does not apply a stimulus. Rather, the test system acquires result signals and performs measurements.

Use of an Intermediary Entity

In some embodiments, an intermediary entity is used. An intermediary entity, or a converter, is a test system entity that acts as both a test data reception element and a test data transmission element. FIG. 6 depicts one such example.

FIG. 6 is a block diagram of a system for testing physical devices by way of an intermediary, according to various embodiments of the present disclosure. FIG. 6 depicts system 600, which includes an out-of-bounds data processing entity (OOB) 610, converter 612, DAQ 614, and DUT 620. In the example depicted in FIG. 6, converter 612 is used due to an incompatibility between OOB 610 and DAQ 614. As can be seen, DAQ 614 supports one test data transfer mechanism, DMA, while OOB 610 supports named pipe as a data transfer mechanism. Accordingly, lacking a common data transfer mechanism, converter 612 receives data 632 from DAQ 614 via DMA and then transmits data 630 to OOB 610 via a named pipe.

OOB 610 is a software process that includes a test data reception element that checks for an out of bounds condition. DAQ 614 is a data-acquisition device and driver that is a test data transmission element. In some cases, the only test data transfer format the DAQ 614 and driver supports is raw (unscaled), while the bounds checking software process supports only volts. Converter 612, an intermediary entity, is a software process that is both a test data reception element and a test data transmission element. Converter 612 can convert from raw data to volts.

DUT 620 passes result 636 to DAQ 614. DAQ 614 analyzes the result and converts the result into data 632. Converter 612 receives data 632, converts the data 632 and passes outputs data 630 to OOB 610. Together with an orchestrator, these entities form a test system that validates whether the signal acquired by the DAQ device stays within specified bounds. The orchestrator uses DBus 638 to apply converter 612 to data 632 produced by DAQ 614 and to check the bounds of the converted data.

Converter 612 accepts a test data reception method, i.e., OOB 610, named pipe, and sends two test data reception methods, DMA and named pipe, to DAQ 614. Converter 612 accepts one test data transmission method, DMA, from the DAQ 614. The intersection of test data reception methods supported by the converter and the software process is just "named pipe." Converter 612 sends one test data transmission method to OOB 610. Converter 612 is programmed to detect that DMA is not in the test data reception methods sent by the software process and to retransmit data received via DMA from DAQ 614 to the software process with a supported method, in the case "named pipe."

Converter 612 accepts one test data format from the software process, volts, and sends two test data formats, raw and volts, to DAQ 614. Converter 612 accepts one test data format, raw, from DAQ 614. The intersection of test data formats supported by converter 612 and the software process is "volts". Accordingly, converter 612 sends one test data format to the data processing entity (volts). Converter 612 is programmed to detect that "raw" is not in the test data formats sent by the software process and to convert raw data received from DAQ 614 to "volts" using properties supplied by the DAQ 614, specifically, a scaling formula and constants, when the data is retransmitted.

Converter 612 combines test data reception methods into a combined list by combining the methods from OOB 610 and DAQ 614. Converter 612 may choose to add, remove, or modify methods in the combined list to achieve various system level goals. Similarly, converter 612 combines test data reception formats into a combined list by combining the formats from OOB 610 and DAQ 614. Converter 612 may choose to add, remove, or modify formats in the combined list to achieve system level goals.

Converter 612 can create one or more modified contents. For instance, a modified first content is a first content that contains the combined lists of test data reception methods and test data reception formats. A modified second content is a second content that contains the combined lists of test data transfer methods and test data transfer formats. Converter 612 determines a modified final transfer method and format by choosing a method and format from the second content. Converter 612 translates the third plurality of test data transfer methods and the third plurality of test data transfer formats into a modified content. A modified third content is a third content that contains the modified final test data transfer method and test data transfer format.

In another example, converter 612 and OOB 610 share two test data transfer mechanisms (e.g., DMA and named pipe) and two test data transfer formats (raw and volts). In this case the modified second content contains annotations that indicate whether a conversion is taking place and any impact on system performance. The orchestrator can configure a DPE to optimize specific system properties. In turn, the DPE uses the annotations in the modified second content to select the data transfer mechanism and format that best meet the configuration.

```
[{"mechanism": "DMA",
   "properties": {
      "addressing": "64 bits",
      "alignment": "16 bytes",
      "minTransfer": "256 bytes",
      "conversion": true,
      "conversion-impact": "CPU"}},
 {"mechanism": "named pipe",
   "properties": {
      "name": "myName",
      "conversion": false},
 {"format": "raw",
   "properties": {
      "scaling": "linear",
      "m, b": "1.01, 3.331",
      "conversion": true,
      "conversion-impact": "CPU"}},
 {"format": "volts"
   "properties": {
      "hardware": true,
      "conversion": false}}]
```

In some embodiments, the test data transmission element (e.g., DAQ 614) is provided with the address of converter 612 and the test data reception element (e.g., 00B 610) is provided with the address of converter 612 and operation proceeds as discussed above. If it is determined that the test data transmission element and the test data reception element can communicate without the use of converter, the data transmission element can be provided with the address of the test data reception element and vice versa. In other embodiments, after an attempt to define methods and formats, an orchestrator is contacted via DBus 638 in order to establish communication with converter 612.

A Network-Device Intermediary

Figure 7:
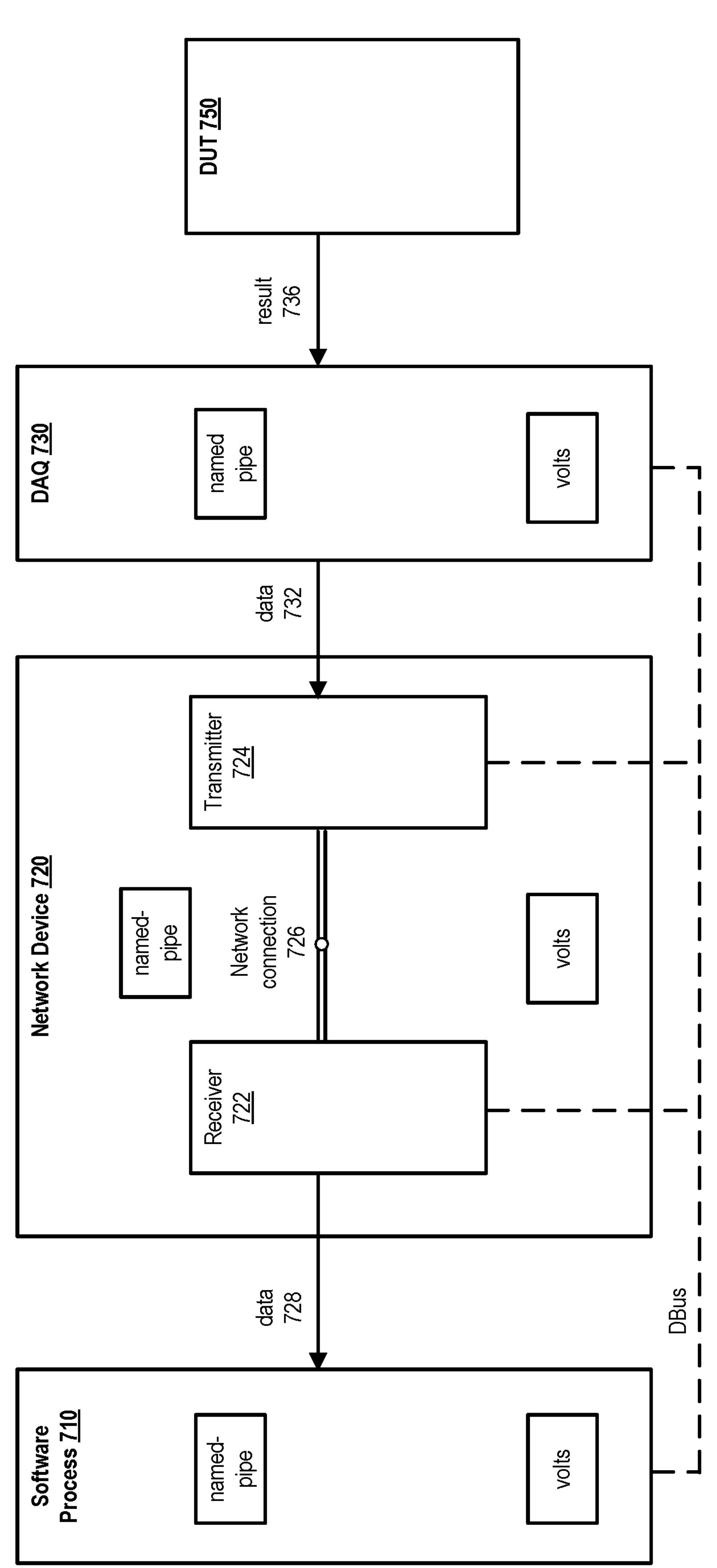
FIG. 7 is a block diagram of a system having a network-based intermediary, according to various embodiments of the present disclosure.

FIG. 7 is a block diagram of a system 700 having a network-based intermediary, according to various embodiments of the present disclosure. System 700 includes software process 710, network device 720, DAQ 730, and DUT

750. In the example depicted, DUT 750 transmits result 736 to DAQ 730, which transmits data 732, via network connection 726 and outputs data 728, which is provided to software process 710.

Network device 720 includes network receiver 722 and network transmitter 724. Network transmitter 724 transmits data over via network connection 726 to network receiver 722. This configuration enables a much greater physical separation between DAQ 730 and software process 710 (more specifically, the computing device on which software process 710 executes). For instance, network connection 726 can be a wired or wireless network. Non-limiting examples include WiFi, cellular, LAN, WAN, etc.

Network device 720 includes network receiver 722 and network transmitter 724, each of which can be software processes. The software processes may run on different computers. The intermediary entity is also a converter that can transfer test data over a network. Because the entities are separated by a network, RabbitMQ (an open source messaging broker) can be used as the configuration bus.

Multi-Stage Entity Pipeline

Figure 8:
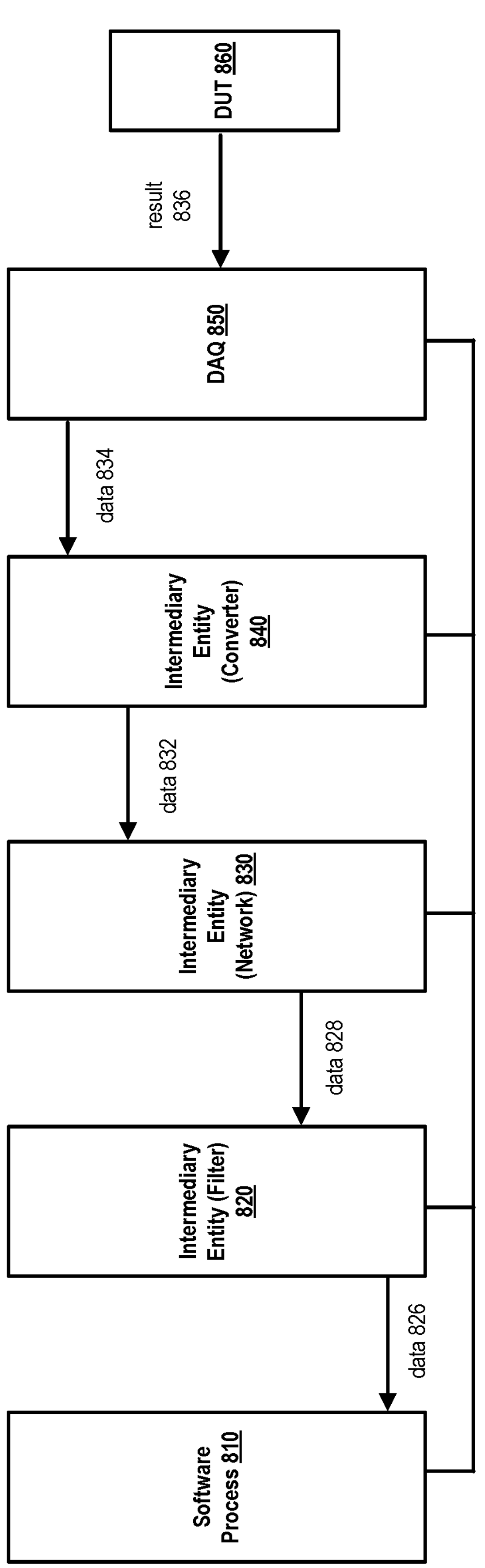
FIG. 8 is a block diagram of a system including a multi-stage pipeline, according to various embodiments of the present disclosure.

FIG. 8 is a block diagram of a system 800 including a multi-stage pipeline, according to various embodiments of the present disclosure. In the example depicted in FIG. 8, DUT 860 provides results 836 to DAQ 850. DAQ 850 transmits data 834 to intermediary entity 840 (a converter), which in turn provides converted data 832 to intermediary entity 830 (a network). Intermediary entity 830 (network) provides data 828 to intermediary entity 820 (a filter), which provides data 826 to software process 810. Any number of conversions and intermediary entities is possible.

In the example depicted in FIG. 8, a plurality of intermediary entities (e.g., three in some embodiments) exist that perform different operations: convert from one test data format to another, transmit test data over the network, filter test data, and process the data. The intermediary entity 840 converts raw data from the DAQ device to volts. Intermediary entity 830 transmits the data over a network. Intermediary entity 820 filters noise from the signal represented by the test data before it is processed into a test result.

Figure 9:
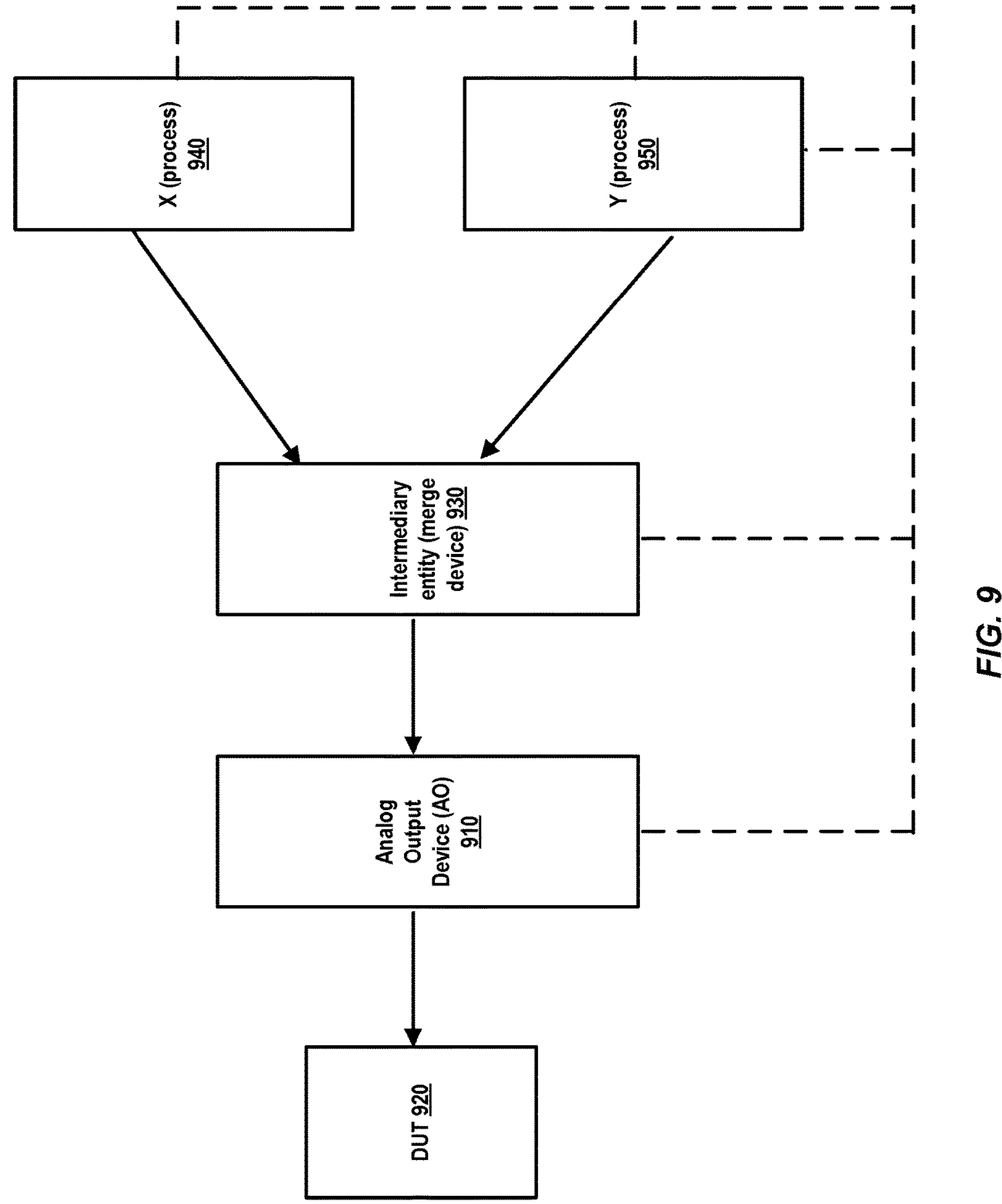
FIG. 9 is a block diagram of a system including a multi-stage pipeline, according to various embodiments of the present disclosure.

FIG. 9 is a block diagram of a system 900 including a multi-stage pipeline, according to various embodiments of the present disclosure. The system 900 illustrated in FIG. 9 can be utilized in cases in which DUT 920 uses a multi-channel input, for example pressure concurrently with temperature or different pressures to different portions of DUT 920. This system can also be used to test two devices under test in parallel. System 900 includes X (process) 940 and Y (process) 950, which are data generation entities having test data transmission elements; intermediary entity 930 (merge device), which is both a test data reception and a test data transmission element; an analog output device 910 (AO), which a signal generation instrument that is also a test data reception element; and DUT 920.

Processes X 940 and Y 950 can each generate stimulus profiles as test data. The test data is provided to intermediary entity 930 (a merge device). Intermediary entity 930 combines the single channel test data received from X 940 and Y 950 into multi-channel test data, which is then transmitted to AO device 910. In turn, AO device 910 converts multi-channel data into electrical signals that are sent to actuators (e.g., two different actuators, each configured to apply a different pressure) connected to the DUT 920. In comparison to FIG. 5, X 940 and Y 950 correspond to two different versions of stress 516 and AO device 910 corresponds to FGEN 514 operating with independent multiple channels. As in previous examples, a DBus is used as a configuration bus for all entities and an orchestrator. Thus, all three independent pipelines can be configured via communications over DBus.

Figure 10:
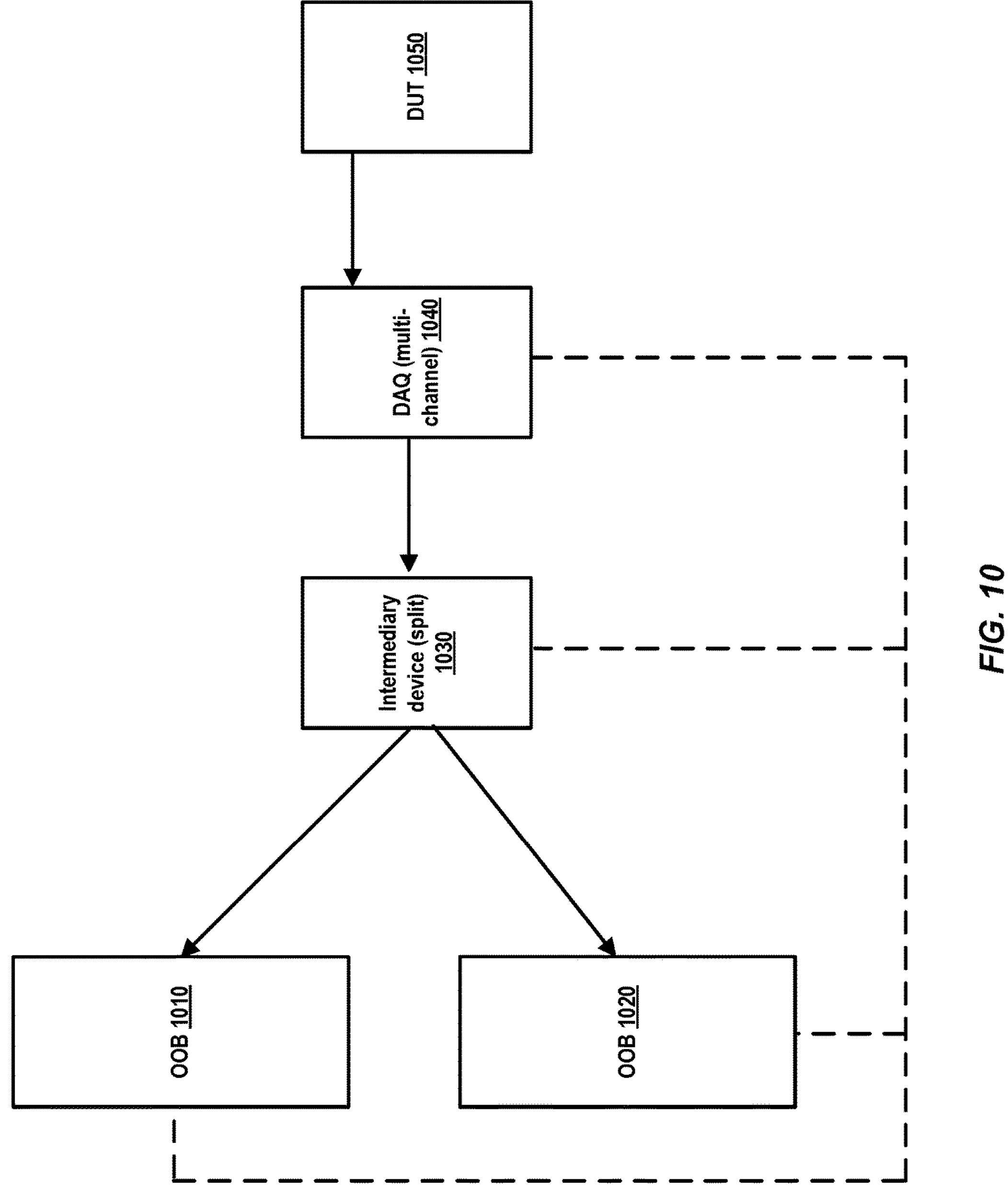
FIG. 10 is a block diagram of a system including a multi-stage pipeline, according to various embodiments of the present disclosure.

FIG. 10 is a block diagram of a system 1000 including a multi-stage pipeline, according to various embodiments of the present disclosure. System 100 depicts an intermediary entity that verifies multiple result signals from a DUT for out-of-bounds conditions in parallel. System 1000 includes OOB 1010 and OOB 1020, intermediary 1030 (a split device), DAQ 1040 (multi-channel), and DUT 1050.

OOB 1010 and OOB 1020 are data processing entities that are test data reception elements. Intermediary 1030 is a software process that is an intermediary entity having both a test data reception element and a test data transmission element. DAQ 1040 is a signal acquisition instrument that is a test data transmission element.

OOB 1010 and OOB 1020 are processes that check for out of bounds conditions. Intermediary 1030 (an intermediary) receives multi-channel test data from DAQ 1040 and transmits single-channel test data to OOB 1010 and OOB 1020. DAQ 1040 is a multi-channel device acquiring two signals from the DUT simultaneously. As in previous examples, DBus is used as a configuration bus for all entities, including an orchestrator.

In the example depicted, there are three data transfers in this example. The first transfers multi-channel test data from DAQ 1040 to the intermediary 1030. The second and third data transfers involve single channel test data from the intermediary 1030 to OOB 1010 and 1020. To negotiate the test data transfers intermediary 1030 proceeds as follows:

- receives test data reception methods and formats from both OOB 1010 and OOB 1020
- sends multi-channel test data reception methods and formats to DAQ 1040
- receives multi-channel test data transfer methods from DAQ 1040
- transmits test data transfer methods to OOB 1010 and OOB 1020
- receives final test data transfer methods from both OOB 1010 (method 1) and OOB 1020 (method 2)
- sends a final multi-channel test data transfer method (method 3) to DAQ 1040

In the example depicted in FIG. 10, the modified first content contains only test data reception methods supported by intermediary 1030 because intermediary 1030 receives the data directly in order to separate the data. The modified second content contains only test data transfer methods supported by the intermediary 1030 because the intermediary 1030 transmits the separated data. The modified second content is sent to both test data processing entities OOB 1010 and OOB 1020.

Once the three test data transfers are configured, the intermediary 1030 receives multi-channel test data from the DAQ 1040, transmits single channel test data to OOB 1010 and transmits single channel test data to OOB 1020. Intermediary 1030 acts as a converter from a multi-channel test data format to single channel test data formats and may also convert between data types. The orchestrator specifies which channel of data is transmitted to OOB 1010 and OOB 1020 using configuration via DBus messages.

Intermediary 1030 transmits test data reception formats to the test data transmitter before knowing what the transmitter is capable of One way to address this is to configure the Intermediary 1030 to send only multi-channel test data formats. In this case, the intermediary 1030 sends only multi-channel test data reception formats to the DAQ entity.

If test data transfer cannot be negotiated, the Split entity reports an error to the orchestrator.

To maximize the chance of successfully establishing test data transfer, the intermediary 1030 can offer single channel formats to the test data transmitter. An example is the system from example 6 where the split entity is not configured to receive a specific format (e.g. multi-channel or single channel). In this case, the split entity sends a multi-channel format for the channels and a single channel format for the channel destined for the first of the OOB processes. If the intersection sent by the DAQ 1040 does not include the multi-channel format, the intermediary 1030 finishes the negotiation sequence with OOB 1010 for the corresponding channel. Intermediary 1030 repeats the negotiation with DAQ 1040 for the remaining channel (and remaining OOB process). Intermediary 1030 offers single channel formats during negotiation and allows test data transfer to be established when DAQ 1040 does not support multi-channel data formats. It further allows data transfer to bypass the Split entity. In this case, the Split entity participates in data-transfer negotiation, but does not participate in the data-transfer itself.

In another example, a converter can increase the chance that test data transfer is established by adding test data transfer methods. An example is the system depicted in FIG. 6, in which converter 612 adds its methods to the list of methods received from the OOB process and sent to DAQ 614. DAQ 614 may include methods from OOB 610 in the intersection it sends to the converter. If a test data format supported by OOB 610 is in the intersection, the converter adds its methods to the intersection methods and sends the combined list to OOB 610. If OOB 610 selects one of its methods as the final method, test data is transferred directly from DAQ 614 to OOB 610 bypassing converter 612. If OOB 610 chooses one of converter 612's test data transfer methods as the final method, test data is transferred as discussed with respect to FIG. 2. If test data transfer cannot be established with converter 612, an error is reported.

A converter can influence the determination of the final test data transfer method and format by removing methods, removing formats, or modifying their properties. When minimizing CPU usage is a system goal, it is appropriate to remove CPU intensive data transfer methods or formats that require extra CPU time to access. A converter can establish direct data communication between different environments by modifying the properties of test data transfer methods. Modifying methods allows entities to be used in situations where they would otherwise report incorrect test data transfer properties. An example is the system from FIG. 5 in which OOB 510 process is running in a VM and using a socket for communication. The VM may be capable of direct socket communication with the host operating system but the socket number would be different than that seen by OOB 510. In this case, the converter modifies the properties of the method before sending them to DAQ 614 so that DAQ 614 uses the method properly.

Figure 11:
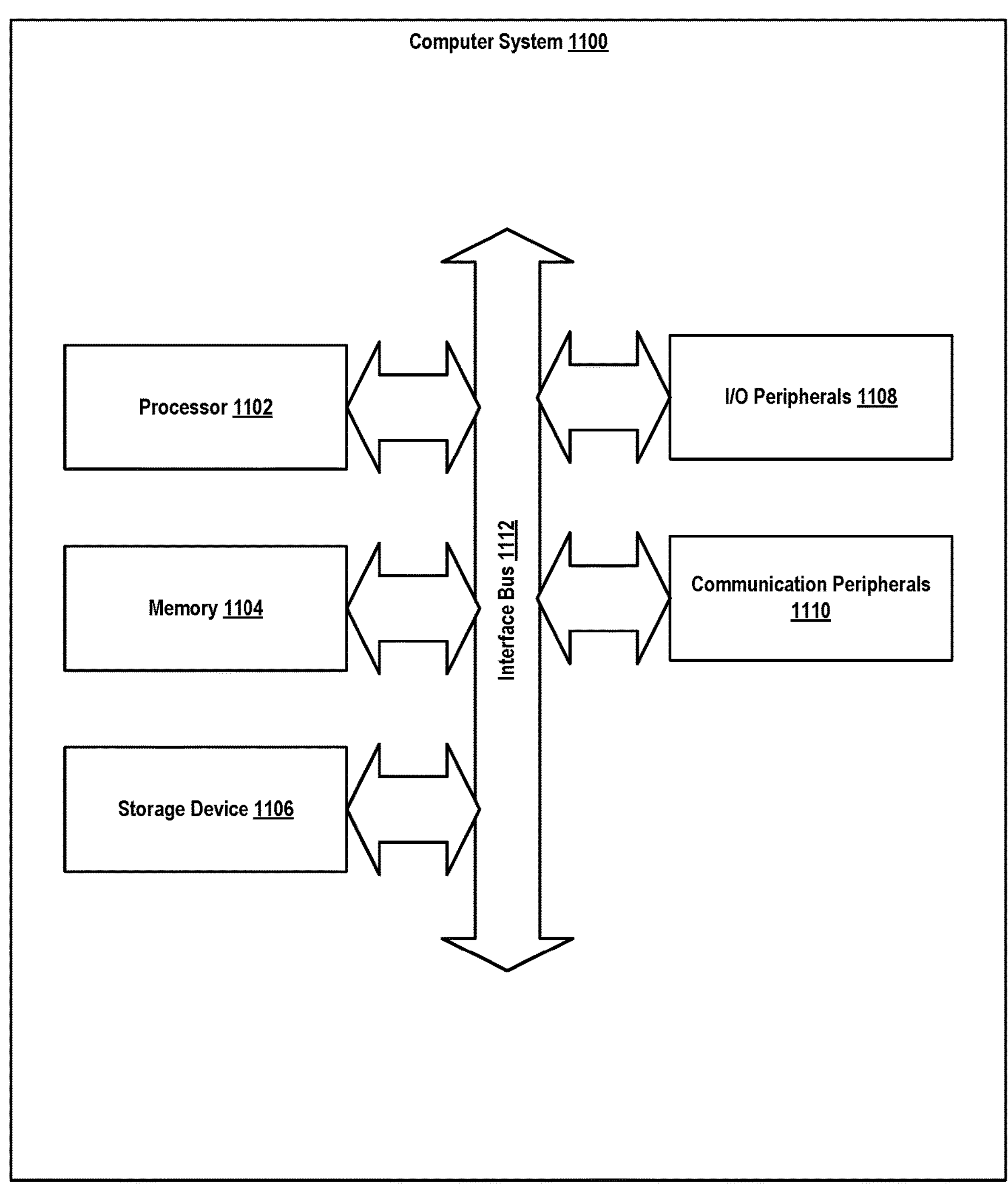
FIG. 11 illustrates examples of components of a computer system, according to various embodiments of the present disclosure.

FIG. 11 illustrates examples of components of a computer system, according to various embodiments of the present disclosure. The computer system 1100 is an example of the computer system described herein above. Although these components are illustrated as belonging to a same computer system 1100, the computer system 1100 can also be distributed. Computer system 1100 can be used to implement method 200 as discussed with respect to FIG. 2, or any other software-based process described herein such as OOB 510, OOB 610, software process 710, process 940, process 950, OOB 1010, and/or OOB 1020.

The computer system 1100 includes at least a processor 1102, a memory 1104, a storage device 1106, input/output peripherals (I/O) 1108, communication peripherals 1110, and an interface bus 1112. The interface bus 1112 is configured to communicate, transmit, and transfer data, controls, and commands among the various components of the computer system 1100. The memory 1104 and the storage device 1106 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1104 and the storage device 1106 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1100.

Further, the memory 1104 includes an operating system, programs, and applications. The processor 1102 is configured to execute the stored instructions and includes, for example, a logical processing unit, a microprocessor, a digital signal processor, and other processors. The memory 1104 and/or the processor 1102 can be virtualized and can be hosted within another computer system of, for example, a cloud network or a data center. The I/O peripherals 1108 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1108 are connected to the processor 1102 through any of the ports coupled to the interface bus 1112. The communication peripherals 1110 are configured to facilitate communication between the computer system 1100 and other computing devices over a communications network and include, for example, a network interface controller, modem, wireless and wired interface cards, antenna, and other communication peripherals.

One of ordinary skill in the art will appreciate that other embodiments may be contemplated, for example but not limited to establishing binning rules having multiple process limits defining various performance characteristics (e.g., clock speed, etc.) for the devices that pass ATE testing without departing from the scope of the present disclosure.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method of testing a device, the method comprising:

accessing a first memory of a first testing device to obtain a plurality of test data reception methods and a plurality of test data reception formats usable by the first testing device;

translating, at the first testing device, the plurality of test data reception methods and the plurality of test data reception formats into a first content that is readable by a plurality of testing devices;

transmitting, using a configuration bus, the first content from the first testing device to a second testing device;

accessing a second memory of the second testing device to obtain a plurality of test data transmission methods and a plurality of test data transmission formats, wherein the plurality of test data transmission methods and the plurality of test data transmission formats are usable by the second testing device;

defining, at the second testing device, one or more test data transfer methods based on a first intersection of the plurality of test data reception methods and the plurality of test data transmission methods;

defining, at the second testing device, independent of defining the one or more test data transfer methods based on the first intersection, one or more test data transfer formats based on a second intersection of the plurality of test data reception formats from the first content and the plurality of test data transmission formats;

translating, by the second testing device, the one or more test data transfer methods and the one or more test data transfer formats into a second content that is readable by the plurality of testing devices;

transmitting, over the configuration bus, from the second testing device to the first testing device, the second content;

determining, at the first testing device, a final test data transfer method and a final test data transfer format based on the second content;

translating, at the first testing device, the final test data transfer method and the final test data transfer format into a third content that is readable by the plurality of testing devices;

transmitting, from the first testing device to the second testing device, the third content; and receiving, at the first testing device, test data using the final test data transfer method and the final test data transfer format.

2. The method of claim 1 wherein the first testing device is signal generation instrument (SGI) that is configured to generate a stimulus for the device under test and the second testing device is a data generation entity (DGE), the method further comprising:

generating, at the first testing device, a testing stimulus based on the test data; and delivering, to the device under test, the testing stimulus, wherein upon receipt of the testing stimulus, the device under test is stimulated by the test data.

3. The method of claim 1 wherein the first testing device is a data processing entity (DPE) and the second testing device is a signal acquisition instrument (SAI), the method further comprising:

receiving, at the second testing device, a result from the device in response to a stimulus; and transmitting, from the second testing device to the first testing device, the test data, the test data based on the result.

4. The method of claim 1 further comprising:

determining that (i) the first intersection comprises zero methods or (ii) the second intersection comprises zero formats; and responsive to the determining, sending an error message.

5. The method of claim 1 wherein transmitting the first content from the first testing device to a second testing device comprises:

transmitting the first content to an intermediary entity;

accessing a third memory of the intermediary entity to obtain, a second plurality of test data reception methods and a second plurality of test data reception formats;

combining, by the intermediary entity, the one or more test data transfer methods and the one or more test data transfer formats from the first content and the second plurality of test data reception methods and the second plurality of test data reception formats into a third plurality of test data reception methods and a third plurality of test data reception formats;

translating, by the intermediary entity, the third plurality of test data reception methods and the third plurality of test data reception formats into a modified first content, wherein the modified first content is readable by the plurality of testing devices; and transmitting, from the intermediary entity, the modified first content to the second testing device.

6. The method of claim 1 wherein transmitting, from the second testing device to the first testing device, the second content comprises:

transmitting the second content to an intermediary entity;

accessing a third memory of the intermediary entity to obtain a second plurality of test data transmission methods and test data transmission formats;

combining, by the intermediary entity, the one or more test data transfer methods and the one or more test data transfer formats from the second content and the second plurality of test data transmission methods and test data transmission formats to form a third plurality of test data transfer methods and a third plurality of test data transfer formats;

translating, by the intermediary entity, the third plurality of test data transfer methods and the third plurality of test data transfer formats into a modified second content; and transmitting the modified second content to the first testing device.

7. The method of claim 3 wherein transmitting the third content comprises:

transmitting the third content to an intermediary entity by the first testing device;

determining a modified final test data transfer method and format by the intermediary entity; and translating the modified final test data transfer method and format into a modified third content that is readable by the plurality of testing devices.

8. A system for testing a device, the system comprising:

a data generation entity (DGE); and a signal generation instrument (SGI) configured to stimulate a device under test and configured to perform operations comprising:

accessing a first memory of an SGI to obtain a plurality of test data reception methods and a plurality of test data reception formats usable by the SGI;

translating, at the SGI, the plurality of test data reception methods and the plurality of test data reception formats into a first content that is readable by a plurality of testing devices;

determining, at the SGI, a final test data transfer method and a final test data transfer format based on a second content;

translating, at the SGI, the final test data transfer method and the final test data transfer format into a third content that is readable by the plurality of testing devices;

transmitting, from the SGI to the DGE, the third content;

receiving, at the SGI, test data using the final test data transfer method and the final test data transfer format;

generating, at the SGI, a testing stimulus based on the test data; and delivering, to a device under test, the testing stimulus, wherein upon receipt of the testing stimulus, the device under test is stimulated by the test data, wherein the DGE is configured to perform operations comprising:

accessing a second memory of the DGE to obtain a plurality of test data transmission methods and a plurality of test data transmission formats, wherein the plurality of test data transmission methods and the plurality of test data transmission formats are usable by the DGE;

defining, at the DGE, one or more test data transfer methods based on a first intersection of the plurality of test data reception methods and the plurality of test data transmission methods;

defining, at the DGE, independent of defining the one or more test data transfer methods based on the first intersection, one or more test data transfer formats based on a second intersection of the plurality of test data reception formats from the first content and the plurality of test data transmission formats;

translating, by the DGE, the one or more test data transfer methods and the one or more test data transfer formats into the second content that is readable by the plurality of testing devices; and transmitting, over a configuration bus, from the DGE to the SGI, the second content.

9. The system of claim 8 wherein each of the test data transfer methods involves one or more of (a) a Direct Memory Access (DMA), (b) a socket, and (c) an inter-process communication.

10. The system of claim 8 wherein each of the test data reception methods involves one or more of (a) a Direct Memory Access (DMA), (b) a socket, and (c) an inter-process communication.

11. The system of claim 8 wherein the SGI is configured to perform operations comprising:

determining that (i) the first intersection comprises zero methods or (ii) the second intersection comprises zero formats; and responsive to the determining, sending an error message.

12. The system of claim 8 wherein transmitting, over the configuration bus, from the DGE to the SGI, the second content, comprises:

transmitting, from the DGE the second content to an intermediary entity;

accessing a third memory of the intermediary entity to obtain, a second plurality of test data reception methods and a second plurality of test data reception formats;

combining, by the intermediary entity, the one or more test data transfer methods and the one or more test data transfer formats from the first content and the second plurality of test data reception methods and the second plurality of test data reception formats into a third plurality of test data reception methods and a third plurality of test data reception formats;

translating, by the intermediary entity, the third plurality of test data reception methods and the third plurality of test data reception formats into a modified second content, wherein the modified second content is readable by the plurality of testing devices; and transmitting, from the intermediary entity, the modified second content to the SGI.

13. The system of claim 8 wherein transmitting the third content comprises:

transmitting the third content to an intermediary entity by the first testing device;

determining a modified final test data transfer method and format by the intermediary entity; and translating the modified final test data transfer method and format into a modified third content that is readable by the plurality of testing devices.

14. The system of claim 8 wherein the second intersection comprises one or more common formats between the plurality of test data reception formats and from the first content and the plurality of test data transmission formats.

15. A system for processing testing data from a device, the system comprising:

a signal acquisition instrument (SAD); and a data processing entity (DPE) configured to perform operations comprising:

obtaining a plurality of test data reception methods and a plurality of test data reception formats usable by the DPE;

translating the plurality of test data reception methods and the plurality of test data reception formats into a first content that is readable by a plurality of testing devices;

determining a final test data transfer method and a final test data transfer format based on a second content;

translating the final test data transfer method and the final test data transfer format into a third content that is readable by the plurality of testing devices;

transmitting, to the SAT, the third content; and receiving, from the SAI and from the device under test, a result using the final test data transfer method and the final test data transfer format, wherein the SAI is configured to perform operations comprising:

accessing a memory of the SAI to obtain a plurality of test data transmission methods and a plurality of test data transmission formats, wherein the plurality of test data transmission methods and the plurality of test data transmission formats are usable by the SAT;

defining, at the SAT, one or more test data transfer methods based on a first intersection of the plurality of test data reception methods and the plurality of test data transmission methods;

defining, at the SAT, independent of defining the one or more test data transfer methods based on the first intersection, one or more test data transfer formats based on a second intersection of the plurality of test data reception formats from the first content and the plurality of test data transmission formats;

translating, by the SAT, the one or more test data transfer methods and the one or more test data transfer formats into the second content that is readable by the plurality of testing devices;

transmitting, over a configuration bus and to the DPE, the second content;

receiving a result from a device under test, wherein the device under test is stimulated by an external device; and transmitting the result to the DPE.

16. The system of claim 15 wherein the final test data transfer method involves one or more of (a) a Direct Memory Access (DMA), (b) a socket, and (c) an inter-process communication.

17. The system of claim 15 wherein each of the plurality of test data reception methods involves one or more of (a) a Direct Memory Access (DMA), (b) a socket, and (c) an inter-process communication.

18. The system of claim 15 wherein the SAI is configured to perform operations comprising:

determining that (i) the first intersection comprises zero methods or (ii) the second intersection comprises zero formats; and responsive to the determining, sending an error message.

19. The system of claim 15 wherein transmitting, over the configuration bus, and to the DPE, the second content, comprises:

transmitting, from the SAI the second content to an intermediary entity;

accessing a third memory of the intermediary entity to obtain, a second plurality of test data reception methods and a second plurality of test data reception formats;

combining, by the intermediary entity, the one or more test data transfer methods and the one or more test data transfer formats from the first content and the second plurality of test data reception methods and the second plurality of test data reception formats into a third plurality of test data reception methods and a third plurality of test data reception formats;

translating, by the intermediary entity, the third plurality of test data reception methods and the third plurality of test data reception formats into a modified second content, wherein the modified second content is readable by the plurality of testing devices; and transmitting, from the intermediary entity, the modified second content to the DPE.

20. The system of claim 15 wherein transmitting, to the SAT, the third content comprises:

transmitting the third content to an intermediary entity by the first testing device;

determining a modified final test data transfer method and format by the intermediary entity; and translating the modified final test data transfer method and format into a modified third content that is readable by the plurality of testing devices.

* * * * *